United States Patent
Beaven et al.

[11] Patent Number: 6,073,439
[45] Date of Patent: Jun. 13, 2000

[54] DUCTED FAN GAS TURBINE ENGINE

[75] Inventors: David M Beaven, Nottingham; Kenneth F Udall, Derby, both of United Kingdom

[73] Assignee: Rolls-Royce plc, London, United Kingdom

[21] Appl. No.: 09/034,908

[22] Filed: Mar. 4, 1998

[30] Foreign Application Priority Data

Mar. 5, 1997 [GB] United Kingdom .................. 9704547

[51] Int. Cl.⁷ .................................................. F02C 7/00
[52] U.S. Cl. ........................... 60/223; 60/226.1; 415/9; 416/2
[58] Field of Search ......................... 60/39.091, 223, 60/226.1, 39.08; 415/9; 416/2

[56] References Cited

U.S. PATENT DOCUMENTS

| | | | |
|---|---|---|---|
| 4,201,513 | 5/1980 | Sales | 416/2 |
| 4,452,567 | 6/1984 | Treby et al. | 416/2 |
| 5,433,584 | 7/1995 | Amin et al. | 415/9 |

FOREIGN PATENT DOCUMENTS

| | | |
|---|---|---|
| 2079402 | 1/1982 | United Kingdom . |
| 2130340 | 5/1984 | United Kingdom . |
| 2281104 | 2/1995 | United Kingdom . |

*Primary Examiner*—Louis J. Casaregola
*Attorney, Agent, or Firm*—W. Warren Taltavull; Farkas & Manelli PLLC

[57] ABSTRACT

A ducted fan gas turbine engine is provided with a fan which is carried by a shaft. Frangible fuse pins maintain the shaft carrying the fan coaxial with the engine longitudinal axis. In the event of severe fan damage, the fuse pins fracture and the fan shaft orbits about the engine longitudinal axis. An annular resilient member is provided to exert a radially inward restoration force upon the fan shaft following such an event in order to reduce vibration.

7 Claims, 4 Drawing Sheets

DUCTED FAN GAS TURBINE ENGINE

This invention relates to a ducted fan gas turbine engine and is particularly concerned with the preservation of the integrity of such an engine following damage to its fan.

Ducted fan gas turbine engines conventionally comprise a core engine which drives a comparatively large diameter propulsive fan positioned at the upstream end of the core engine. The fan is thus vulnerable to damage as a result of foreign object ingestion by the engine. In most cases, the fan is sufficiently robust to withstand the effects of such foreign object ingestion without suffering major damage and is able to continue operating, although, perhaps, at reduced efficiency.

On very rare occasions, the fan may be damaged to such an extent that parts of one or more of the aerofoil blades that make up the fan are lost. This usually necessitates the shutting-down of the engine involved to minimise the hazard to the aircraft carrying it. However, the imbalance in the fan created by the blade loss generates extremely high loads which must be at least partially absorbed as the engine is run-down to windmilling speed. Windmilling speed is the speed at which the engine rotates in a non-operative condition as a result of its motion through the atmosphere.

One way in which fan imbalance load absorption can be achieved is by the use of so-called "fuse pins". Typically the main bearing supporting the shaft carrying the fan is connected radially to the remainder of the engine structure via a plurality of axially extending fuse pins. In the event of a major fan imbalance, the resultant high radial loads cause the fuse pins to fracture in shear to allow the fan and its shaft to orbit about the engine's longitudinal axis. This continues as the engine is allowed to run down to windmilling speed. Such arrangements are disclosed in GB2079402 and GB2130340.

Unfortunately, under certain circumstances, the vibration resulting from fan imbalance that still exists at windmilling speed can still be extremely severe. This is due mainly to the natural frequency of vibration of the fan and the lack of radial stiffness of the fan assembly.

It is an object of the present invention to provide a ducted fan gas turbine engine in which the natural frequency of vibration of the fan at windmilling speeds following the fracture of the fuse pins is modified to reduce vibration.

According to the present invention, a ducted fan gas turbine engine includes a propulsive fan mounted on a shaft, which shaft is normally coaxial with said engine longitudinal axis, said fan shaft being radially supported by a bearing support structure which is in turn supported from fixed structure of said engine by radially frangible connection means, and restoration means comprising an annular resilient member coaxial with said engine longitudinal axis and interconnecting said fan bearing support structure and said engine fixed structure, said resilient member being of generally sinuous cross-sectional configuration in a plane containing said engine longitudinal axis and having sufficient radial resilience as to ensure that it exerts a radially inward restoration force upon said fan bearing support structure subsequent to any radial excursion of at least part of said fan shaft relative to said engine longitudinal axis following any fracture of said frangible connection means.

Preferably said resilient member defines a plurality of concentric, radially separated parts which are serially interconnected at their axial extents.

Preferably the axial lengths of said radially separated parts of said resilient member progressively decrease the more radially inward they are positioned.

Said resilient member may interconnect said fan bearing support structure and fixed structure partially defining the gas passage through said engine.

Said fixed structure partially defining the gas passage through said engine may comprise the radially inner platforms of an annular array of aerofoil stator vanes.

Said resilient member is preferably formed from a metallic sheet material.

Said metallic sheet material may be formed from titanium or an alloy thereof.

The present invention will now be described, by way of example, with reference to the accompanying drawings in which.

Figure 1:
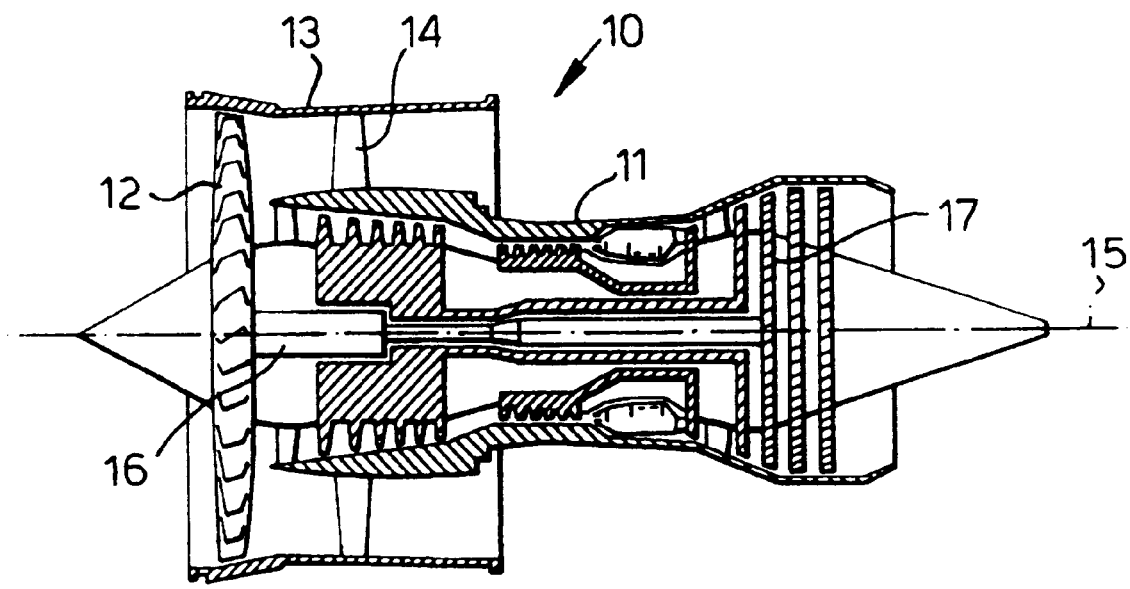
FIG. 1 is a schematic sectioned side view of a ducted fan gas turbine engine in accordance with the present invention.

With reference to FIG. 1, a ducted fan gas turbine engine generally indicated at 10 is of mainly conventional construction. It comprises a core engine 11 which functions in the conventional manner to drive a propulsive fan 12 positioned at the upstream end of the core engine 11 (the term "upstream" as used herein is with respect to the general direction of gas flow through the engine 10, that is, from left to right as viewed in FIG. 1). The propulsive fan 12 is positioned within a fan casing 13 which supported from the core engine 11 by an annular array of outlet guide vanes 14. The ducted fan gas turbine engine 10 has a longitudinal axis 15 about which its major rotational parts rotate.

The fan 12 is mounted on a shaft 16 which under normal circumstances is coaxial with the engine longitudinal axis 15 and which is driven in the conventional manner by the low pressure turbine portion 17 of the core engine 11. The manner in which the upstream region of the fan shaft 16 is supported from the fixed structure of the engine 10 can be seen if reference is now made to FIG. 2.

The fan shaft 16 supports a stub shaft 18 which in turn carries the fan 12 on its radially outer surface in the conventional manner. The fan 12 comprises a disc 19 which carries an annular array of generally radially extending aerofoil blades 20.

The fan shaft 16 is coaxial with the engine's longitudinal axis 15 and extends almost the whole length of the gas turbine engine 10 to interconnect the fan 12 with the low pressure turbine 17 of the core engine 11. The fan shaft 16 is supported from the remainder of the core engine 11 by a number of roller bearings, one of which 21 supports the upstream end of the fan shaft 16. The roller bearing 21 comprises a radially inner race 22, which is located upon the external surface of the fan shaft 16, a radially outer race 23 and a plurality of roller bearing elements 24 which are interposed in an annular array between the inner and outer races 22 and 23.

Figure 2:
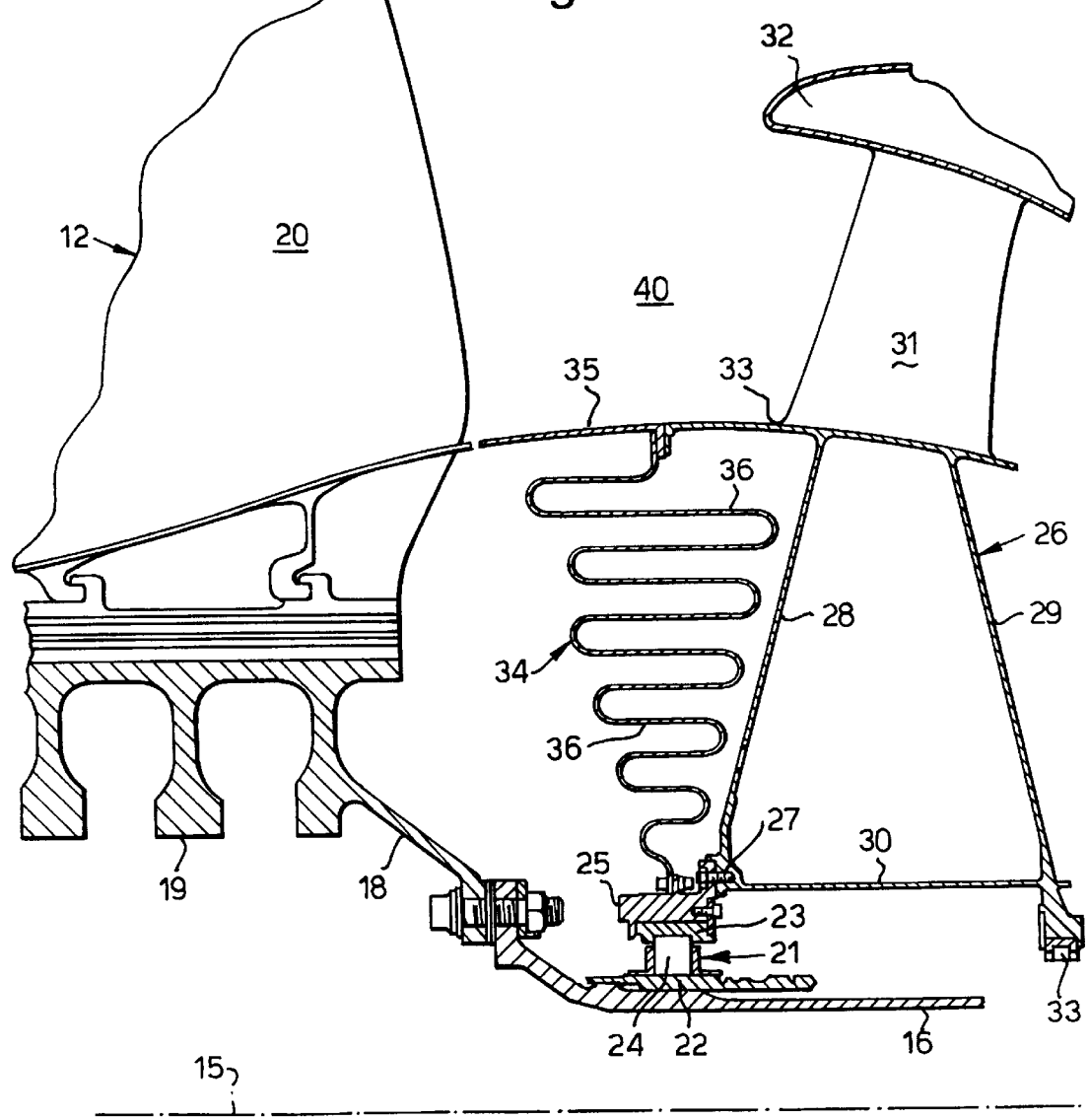
FIG. 2 is a sectioned side view on an enlarged scale of a portion of the ducted fan gas turbine engine shown in FIG. 1 in the region of its fan.

The radially outer race 23 is carried by a support ring 25 which is attached to the fixed structure 26 of the core engine 11 by a plurality of fuse bolts 27, one of which can be seen in FIG. 2. The fixed structure 26 is in the form of two annular panels 28 and 29 which are axially spaced apart at their radially inner extents by a cylindrical part 30. Their radially outer extents are interconnected by an annular member configured to define the radially inner platforms 33 of an annular array of stator aerofoil vanes 31. The vanes 31 are attached, in turn, to the outer casing 32 of the core engine 11. The fixed structure 26 additionally supports a further bearing 33 which in turn supports a further engine shaft (not shown). In the event of the fan 12 suffering damage to one or more of its aerofoil blades 20 which places it significantly out-of-balance, considerable radial loads are transmitted from the fan shaft 16 to the support ring 25 via the roller bearing 21. Those loads are then in turn transmitted to the core engine fixed structure 26 via the fuse pins 27. However, in order to protect the core engine 11 from being seriously damaged by the loads, the fuse pins 27 are designed so as to be frangible in such a manner that they fracture in shear when subjected to loads above a predetermined magnitude. If this occurs, the upstream end of the fan shaft 16 no longer has radial support following fracture of the fuse pins 29, and so it proceeds to orbit around the engine longitudinal axis 15. This, in turn, results in the bearing support ring 25 following that orbiting motion.

Conventionally, the fuel flow to the engine 10 is discontinued and the fan 12 is allowed to run down to windmilling speed following major fan damage. However, at windmilling speeds, there is a likelihood of the fan 12 approaching its natural frequency which could result in the fan 12 vibrating to such an extent that the integrity of the engine 10 is threatened.

In order to alter the natural frequency of the fan 12 under these circumstances, the rotational axis of the fan 12 is urged back towards a coaxial relationship with the engine longitudinal axis 15 so that the overall stiffness of the core engine 11 is restored. This is achieved by the application of a radial restoration force to the fan shaft 16.

The radial restoration force is applied to the fan shaft 16 via a member 34 which is resilient in radial directions. The resilient member 34 is annular so as to interconnect the bearing support ring 25 with a part 35 of the radially inner platforms 33 which define a portion of the gas passage 40 through the core engine 11 and which are positioned at the radially inner extents of the stator vanes 31. The resilient member 34 thus interconnects the bearing support ring 25 with the fixed engine structure as defined by the radially outer portion of the support member 26.

As can be seen from FIG. 2, the resilient member 34 is formed from sheet titanium (or a suitable alloy thereof) to be of generally sinuous cross-sectional configuration in a plane containing the engine longitudinal axis 15. Titanium is preferred in view of its high proof stress and low Young's Modulus. It defines a plurality of concentric, radially separated annular parts 36 which are serially interconnected at their axial extents. Additionally, the axial lengths of the annular parts 36 progressively decrease the more radially inward they are positioned. The axial extents of four of the annular parts 36 showing the manner of their serial interconnection can be seen more clearly if reference is made to FIG. 3.

The resilient member 34 serves to exert a radial restoration force upon the fan shaft 16 via the support ring 25 and bearing 21 in the event of the fan 12 going out of balance. This is sufficient to raise the natural frequency of the fan 12 to a value which is consistent with the reduction of severe vibration at windmilling speeds.

Figure 3:
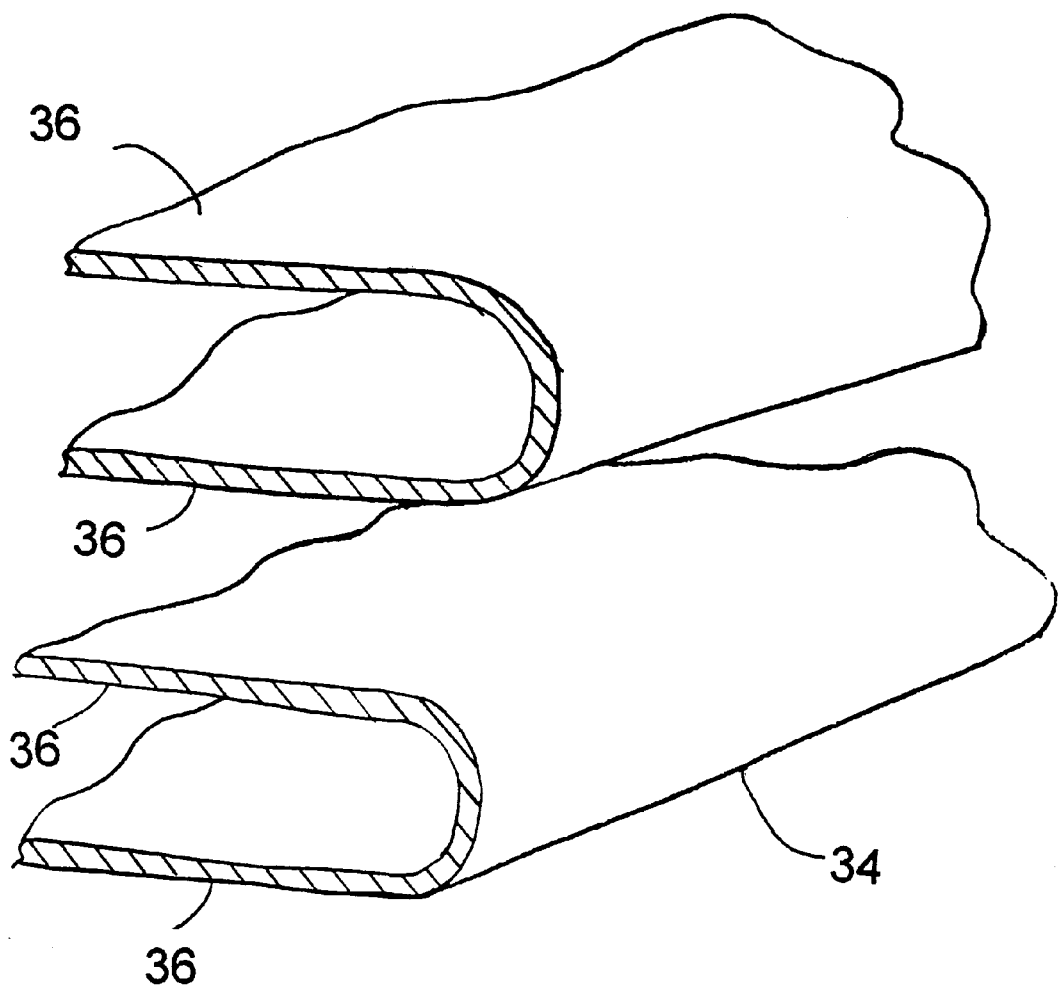
FIG. 3 is a perspective view on an enlarged scale of a part of one of the components visible in FIG. 2.
Figure 4:
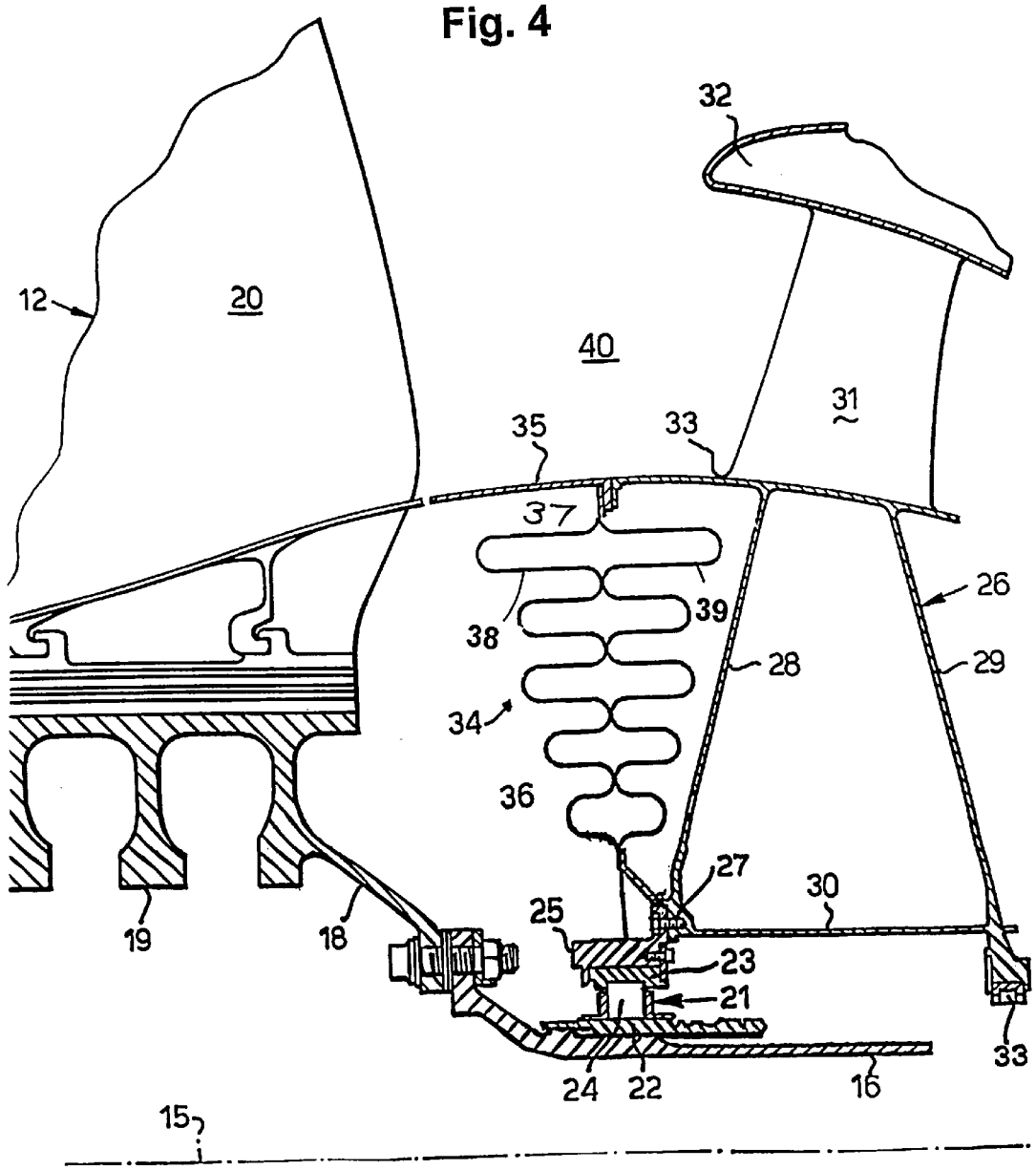
FIG. 4 is a view similar to that of FIG. 2 showing an alternative form of the present invention.

It will be appreciated that there could be alternative configurations for the resilient member 34 such as that shown in FIG. 4. In the embodiment of FIG. 4, in which components common to the embodiment of FIGS. 2 and 3 are indicated by the same reference number, the resilient member 37 is constituted by two parts 38 and 39. The parts 38 and 39 are generally similar in configuration to the resilient member 34 of the embodiment of FIGS. 2 and 3. However, the parts 38 and 39 are in axial side-by-side relationship in order to enhance their effectiveness.

We claim:

1. A ducted fan gas turbine engine including a propulsive fan mounted on a shaft, which shaft is normally coaxial with said engine longitudinal axis, a bearing support structure, said fan shaft being radially supported by said bearing support structure, radially frangible connection means which support said bearing support structure from fixed structure of said engine, and restoration means comprising an annular resilient member coaxial with said engine longitudinal axis and interconnecting said fan bearing support structure and said engine fixed structure, said resilient member being of generally sinuous cross-sectional configuration in a plane containing said engine longitudinal axis and having sufficient radial resilience as to ensure that it exerts a radially inward restoration force upon said fan bearing support structure subsequent to any radial excursion of at least part of said fan shaft relative to said engine longitudinal axis following any fracture of said frangible connection means.

2. A ducted fan gas turbine engine as claimed in claim 1 wherein said resilient member defines a plurality of concentric, radially separated parts which are serially interconnected at their axial extents.

3. A ducted fan gas turbine engine as claimed in claim 2 wherein the axial lengths of said radially separated parts of said resilient members progressively decrease the more radially inward they are positioned.

4. A ducted fan gas turbine engine as claimed in claim 1 wherein said resilient member interconnects said fan bearing support structure and fixed structure partially defining the gas passage through said engine.

5. A ducted fan gas turbine engine as claimed in claim 4 wherein said fixed structure partially defining the gas passage through said engine comprises the radially inner platforms of an annular array of aerofoil stator vanes.

6. A ducted fan gas turbine engine as claimed in claim 1 wherein said resilient member is formed from a metallic sheet material.

7. A ducted fan gas turbine engine as claimed in claim 6 wherein said metallic sheet material is formed from titanium or an alloy thereof.

* * * * *